April 11, 1950 — M. L. FOERSTER — 2,503,475
CITRUS FRUIT SECTOR
Filed May 6, 1947
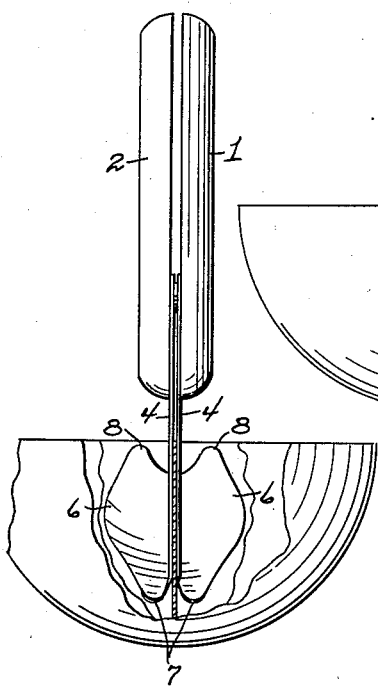
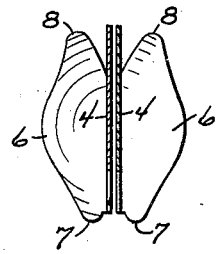
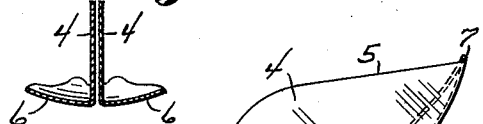
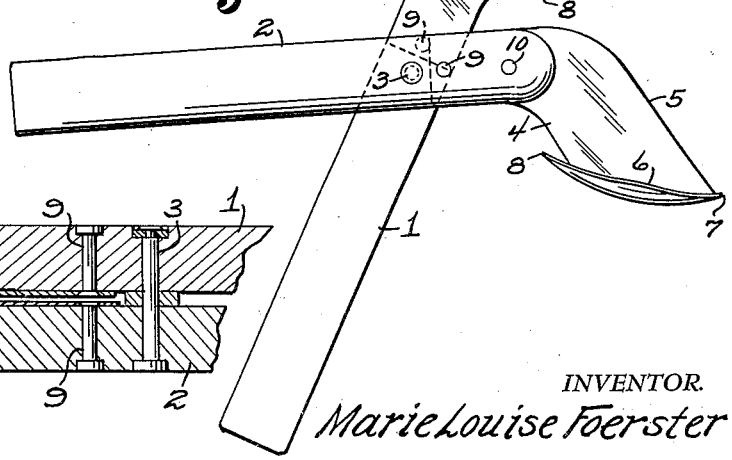
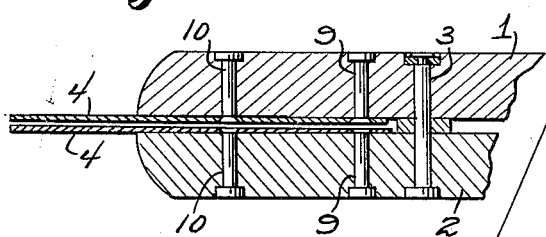
INVENTOR.
Marie Louise Foerster
BY Victor J. Evans & Co.
ATTORNEYS

Patented Apr. 11, 1950

2,503,475

UNITED STATES PATENT OFFICE 2,503,475

CITRUS FRUIT SECTOR

Marie Louise Foerster, North Hollywood, Calif.

Application May 6, 1947, Serial No. 746,348

1 Claim. (Cl. 30—24)

This invention relates to cutting devices for preparing fruits, and more particularly to improvements in devices for cutting the edible segments of citrus fruits.

It is an object of the invention to provide a tool by means of which edible segments of citrus fruit can be cut clean of the separating walls and the peel or rind.

A further object is to provide a device for cutting citrus fruits to remove the edible portions, which device is of very simple structure and easy to manipulate.

A further object is to provide a device for cutting out the edible portions of citrus fruits, which device has parts of certain lengths and arranged at certain angles which have been found highly effective for the desired purpose. The device is made of non-corrosive metals and is capable of being inexpensively manufactured.

These and other objects are attained by the novel arrangement and construction of parts hereinafter described and illustrated by the accompanying drawings, forming a part hereof, and in which:

Fig. 1 is an elevational view showing the manner in which the device is used to remove segments of citrus fruit.

Fig. 2 is a front view of the device during the operation of removing segments of citrus fruit.

Fig. 3 is an elevational view of the device in an open condition.

Fig. 4 is a sectional view taken on the line 4—4 of Fig. 1.

Fig. 5 is a sectional view taken on the line 5—5 of Fig. 1.

Fig. 6 is a sectional view taken on the line 6—6 of Fig. 1.

Referring to the drawings, the device for removing edible segments from citrus fruits is shown to comprise two juxtaposed handles 1 and 2, pivotally connected by a rivet 3 or the like. Since the two handles are of identical shape, it is only necessary to describe one of the handles.

Attached to each handle and extending at an angle therefrom is a blade 4, which has a straight sharp upper edge 5. At the lower part of the blade is a flange 6 which forms with the forward portion of the blade a point 7. The flange is arcuate and has at its rear end a pointed portion 8 extending beyond the blade. The rear portion 8 is turned upwardly as shown in Fig. 1. The point 7 extends slightly in advance of the blade, and the flange is substantially of a scoop shape.

It has been found that with the angle between the upper edge of the handle and the upper edge of the blade made 65 degrees the most effective results are obtained. Likewise, the distance from the pivot to the end of the handle should be 3½ inches; and the horizontal distance of the pivot to the point 7 is 2½ inches.

The blade 4 is attached to the handle by means of rivets 9 and 10.

In operation, the two blades straddle or slide over both sides of a wall separating segments of a citrus fruit, at the point where it joins the peel, and are moved forwardly and downwardly, thus cutting two segments free of the separating wall, and clearing segments from the other walls that embrace them. Thus, two segments are freed from the walls and from the peel, the flanges clearing the other two walls and separating the segments from the peel. The fruit can be turned over and the edible segments will fall out.

The handle is preferably made of aluminum, and the blade of a stainless steel, so that they will not corrode if properly cleaned.

The device, obviously, is of simple structure, effective in operation, and has few parts to get out of order.

The blades have substantially parallel sides with the flanges formed at the end of the blades at acute angles to the sides.

The above description is to be considered as illustrative and not limitative of the invention of which modifications can be made without departing from the spirit and scope of the invention, as set forth in the appended claim.

The invention having been described, what is claimed is:

A device for preparing fruit comprising a pair of handles, means pivoting the same together, parallel and spaced blades attached to said handles, respectively, said blades being spaced a predetermined distance apart whereby the same is adapted to straddle a fruit partition between adjacent fruit cells of the piece of fruit each said blade being offset from its handle and having a forward portion, a rearward portion and a bottom portion joining the first two portions, said forward portion having a substantially straight cutting edge, said bottom portion extending in the direction toward its respective handle and at an acute angle with said forward portion toward said rearward portion whereby said cutting edge portion and bottom edge portion meet at a point, and arcuate cutting wings extending in opposite directions transversely from said bottom portions, respectively, each said arcuate wing extending a predetermined distance beyond the forward and rearward portions of the respective blade to which it is attached.

MARIE LOUISE FOERSTER.

REFERENCES CITED

The following references are of record in the file of this patent:

UNITED STATES PATENTS

| Number | Name | Date |
|---|---|---|
| 268,997 | Brion | Dec. 12, 1882 |
| 1,115,001 | Merrill | Oct. 27, 1914 |